United States Patent [19]

Glennie

[11] 4,342,338

[45] Aug. 3, 1982

[54] BOOT FOR SEALING RUPTURED GAS OR WATER MAINS AND TOOL FOR APPLICATION

[75] Inventor: William L. Glennie, Phoenix, Ariz.

[73] Assignee: Jack M. Mitchell, Phoenix, Ariz.; a part interest

[21] Appl. No.: 185,768

[22] Filed: Sep. 10, 1980

[51] Int. Cl.³ ............................................. F16L 21/06
[52] U.S. Cl. ............................................. 138/99
[58] Field of Search ............................. 138/99, 97

[56] References Cited

U.S. PATENT DOCUMENTS

| 676,582 | 6/1901 | Helmerich | 138/99 |
| 1,928,570 | 9/1933 | Mustico | 138/99 |
| 3,502,112 | 3/1970 | Hankila | 138/99 |
| 4,083,588 | 4/1978 | Berger | 138/99 |

Primary Examiner—Robert I. Smith
Attorney, Agent, or Firm—Warren F. B. Lindsley

[57] ABSTRACT

A sealing boot that may be secured about a gas or water main over a ruptured portion thereof to seal off the leak and permit continuity of customer service while the main is repaired. An application tool and the method or procedure by which the repairs are made without interruption of service are also disclosed.

7 Claims, 12 Drawing Figures

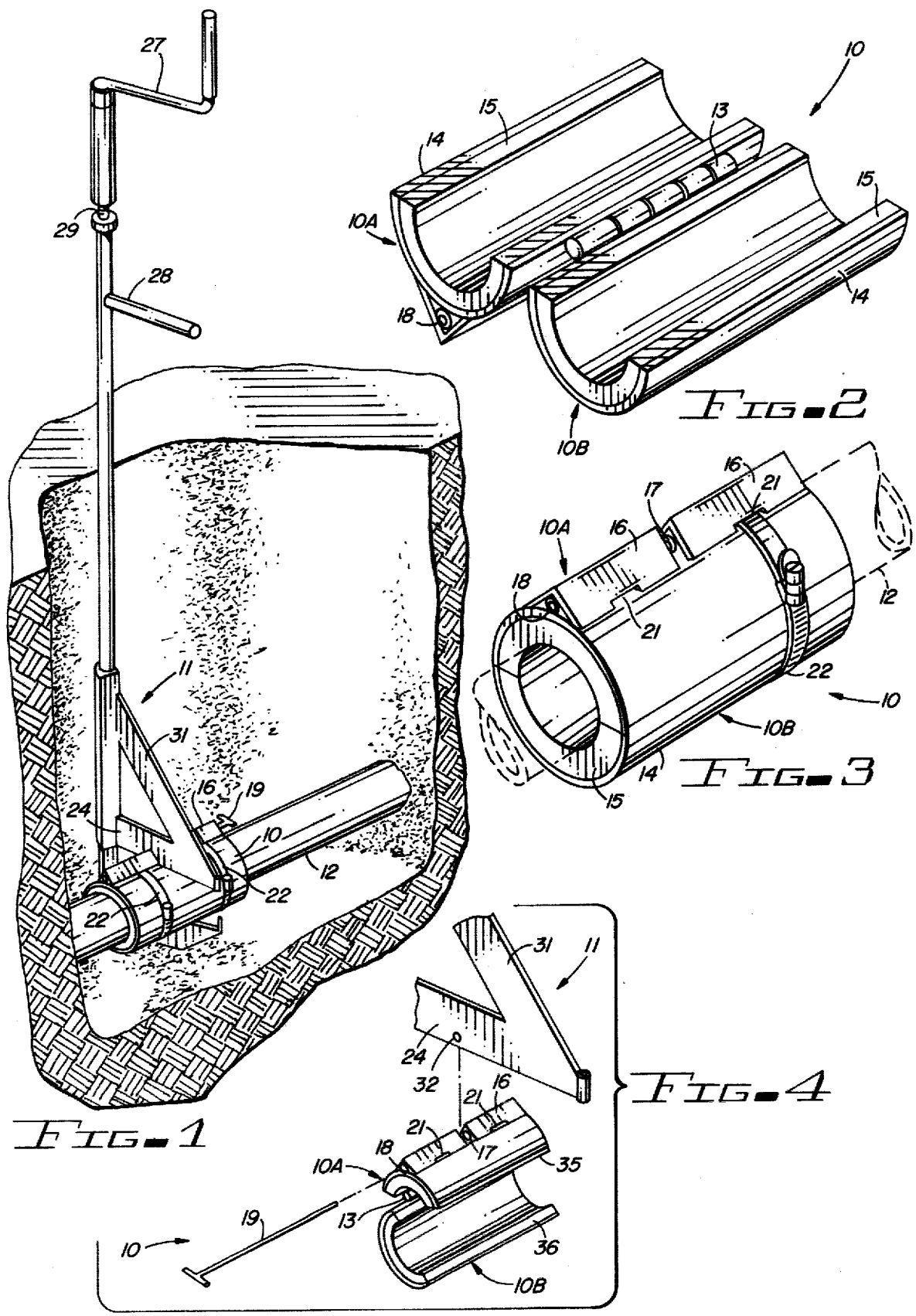

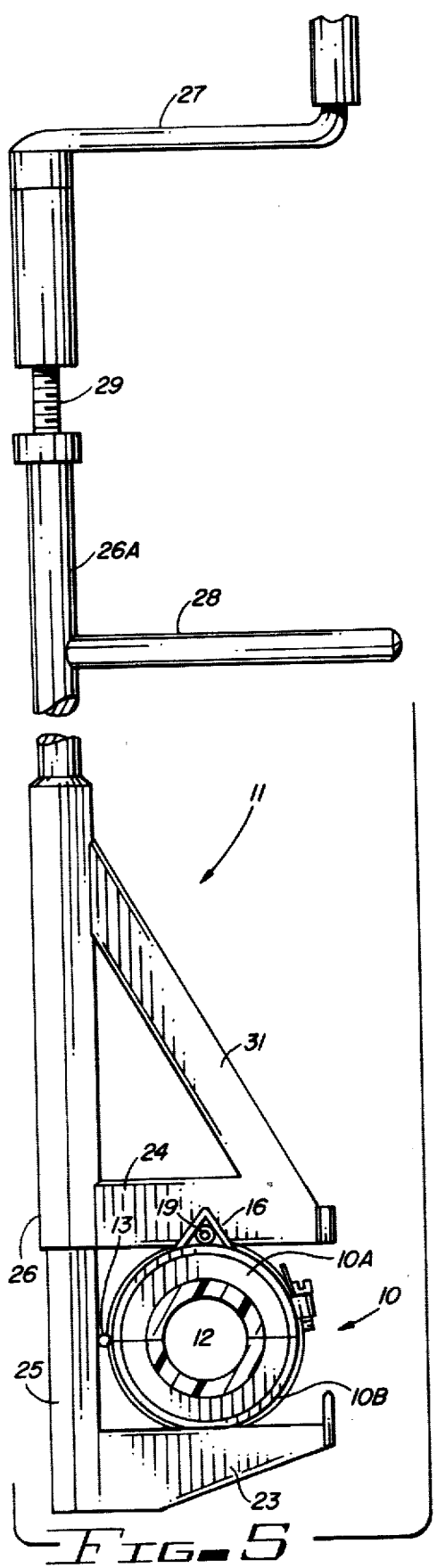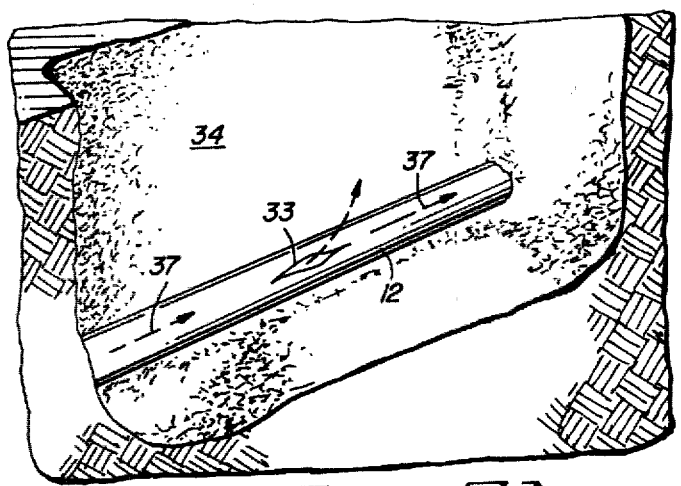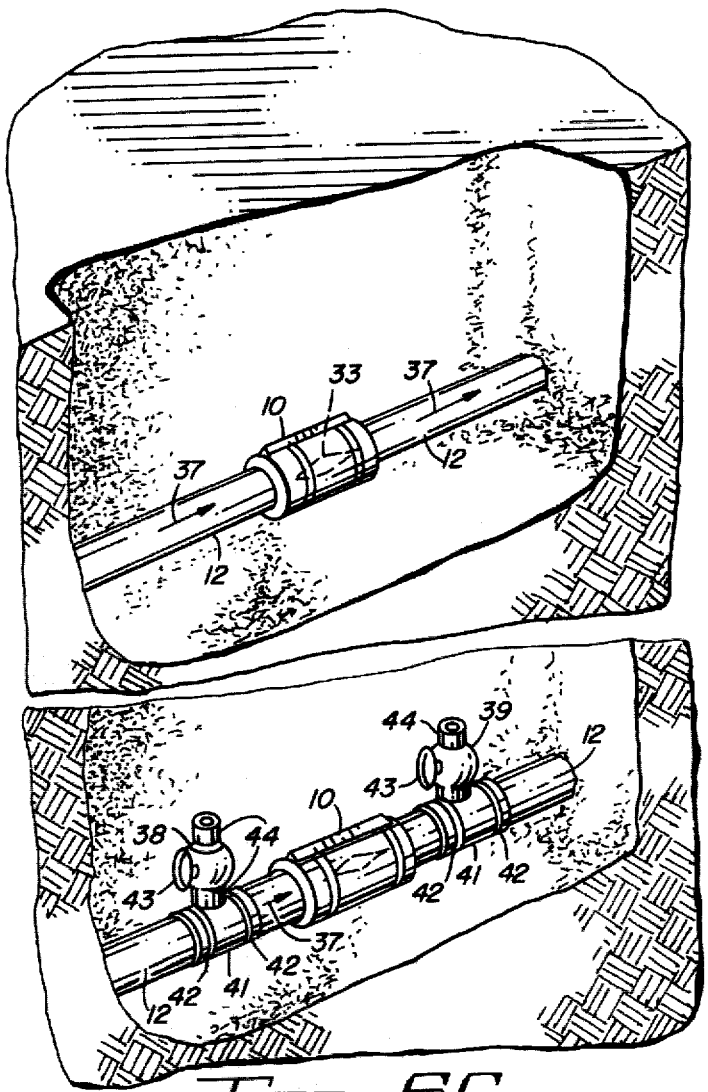

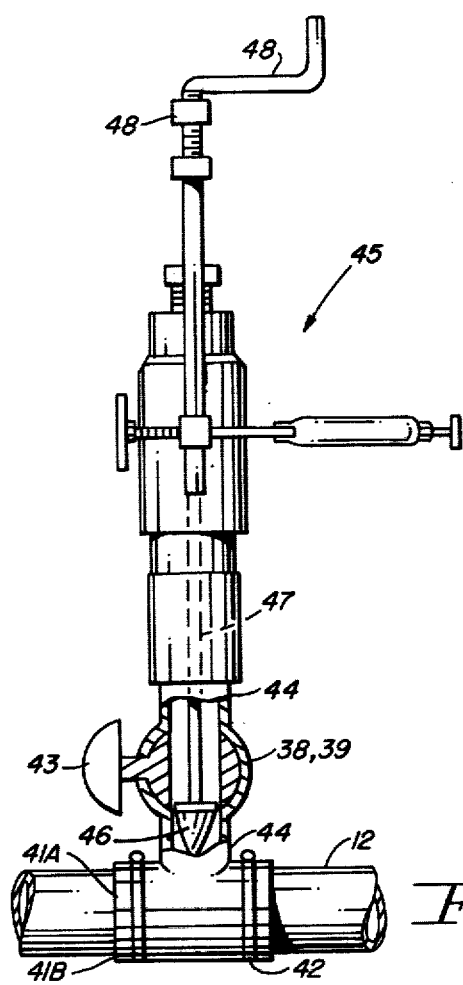
FIG-6D
FIG-6F
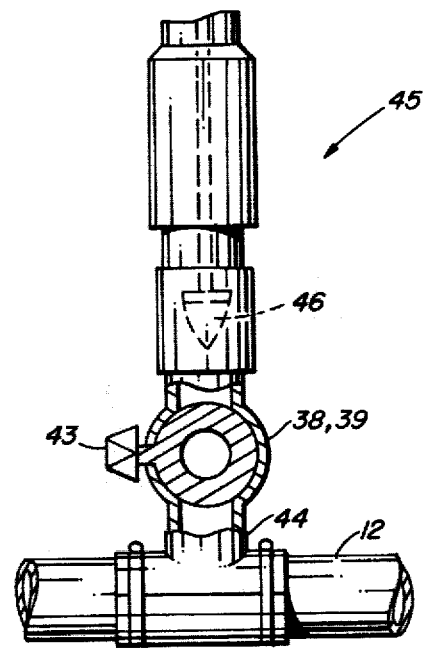
FIG-6E
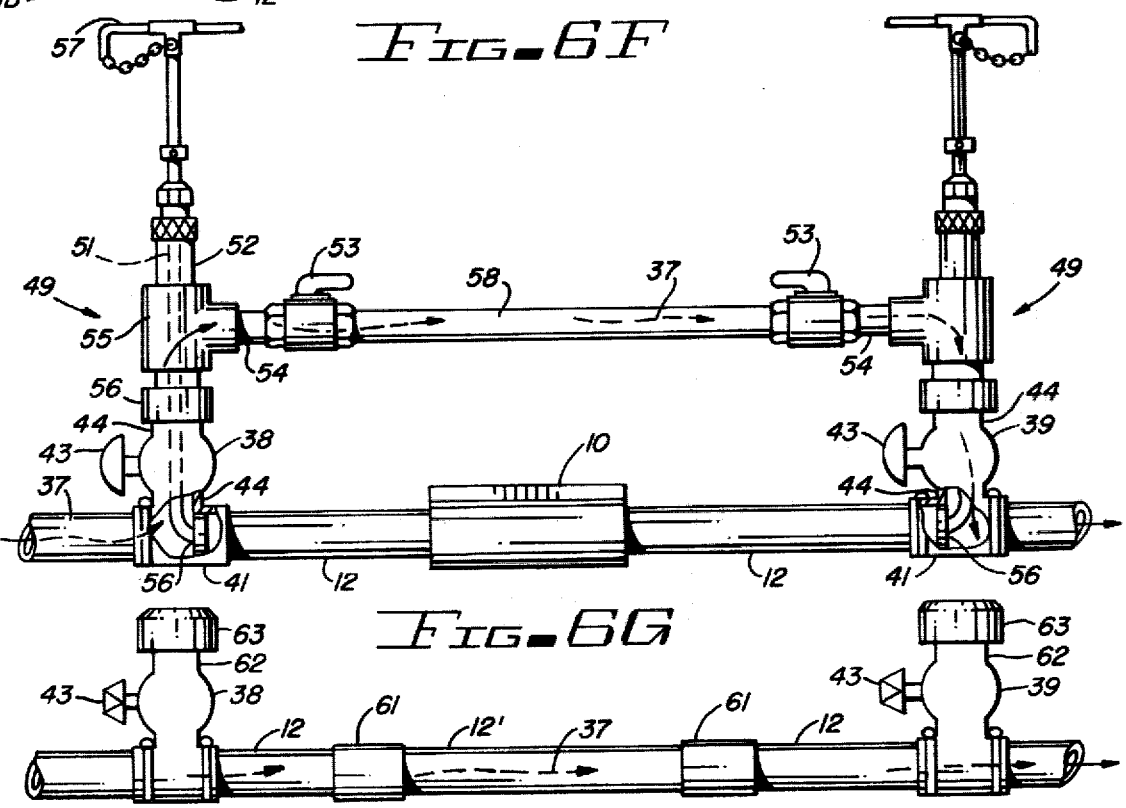
FIG-6G

BOOT FOR SEALING RUPTURED GAS OR WATER MAINS AND TOOL FOR APPLICATION

BACKGROUND OF THE INVENTION

Gas and water distribution systems in cities and towns are laid out in a manner intended to serve a maximum number of users or customers with a minimum utilization of pipe. In such a system a single main may serve a very large number of customers.

Quite frequently such mains are ruptured, due either to natural or man-made occurrences. Whether conditions such as floods, earthquakes or extreme temperature changes can cause the pipe or conduit to be shifted in its position or stressed to the extent that is experiences fracture or separation. Construction of streets, sewage systems, installation of underground electrical distribution and other such operations involving excavation or trenching are common causes of broken or ruptured water and gas mains. Oxidation, galvanic action and other chemical reactions can also produce ruptures and leaks.

When such a rupture occurs it is important that repairs are made as quickly as possible to minimize safety hazards, as in the case of a broken gas main, and also to minimize the loss of the commodity being distributed.

DESCRIPTION OF THE PRIOR ART

In the past, the most common practice has been to seal off the water or gas main as quickly as possible, this action constituting a first emergency action taken to achieve the aforementioned objectives. Typically, an emergency crew was dispatched to the site of the rupture and the pipe or main was sealed off by crimping or pinching, using a special tool applied immediately upstream from the point of fracture. The flow of gas or water to customers located downstream from the fracture was thus terminated until a repair crew was able to replace the broken section of pipe. In the case of a broken gas main, follow-up crews had to be sent out to light the pilots on all affected customer equipment.

The costs to the utility companies and the cost and inconvenience experienced by the customers resulting from such interruptions of service can be considerable and higher utility costs for everyone inevitably result.

There is, therefore, an urgent need for improved equipment and procedures which will significantly reduce or eliminate the interruption of customer service when such fractures or ruptures occur.

SUMMARY OF THE INVENTION

In accordance with the invention claimed, a sealing boot is provided that may be secured about a gas or water main over a ruptured portion thereof to seal off the leak and permit continuity of customer service while the main is repaired.

It is, therefore, an object of this invention to provide a sealing boot that may be secured around a ruptured gas or water main to seal off the leak while permitting continuity of service to customers served by the main.

Another object of the invention is to provide such a sealing boot in a form which may be secured to the main with the aid of a simple tool, also disclosed as a part of this invention.

A further object of this invention is to provide such a boot in a form that may readily be secured to the main without requiring undue exposure of the service personnel to the escaping gas during the process of applying the boot.

A still further object of this invention is to provide such a boot in a form that permits the repeated use of the same boot.

A still further object of this invention is to provide such a boot in a simple and inexpensive yet reliable and effective form.

Yet another object of this invention is to provide a procedure involving the use of such a sealing boot which permits the rapid termination of the gas or water leak and the subsequent repair or replacement of the fractured portion of the main without interruption of customer service.

Other objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The invention may be more readily described by reference to the accompanying drawing, in which:

FIG. 1 is a perspective view showing the sealing boot of the invention having just been secured in position about a ruptured water or gas main using a tool also disclosed as a feature of the invention;

FIG. 2 is a perspective view of the sealing boot of the invention shown in an opened condition;

FIG. 3 is a perspective view of the sealing boot in a closed or locked position along with a partial phantom view of a water or gas main about which it has been secured;

FIG. 4 is a perspective view of the sealing boot shown in relationship with the mating portion of the tool that is employed in securing the clamp to the main;

FIG. 5 is a side view of the tool in position over the sealing boot of the invention shown in cross-section as secured about a gas or water main;

FIG. 6A is a perspective view of a ruptured underground water or gas main with the earth removed about the ruptured portion in preparation for sealing and repair operations;

FIG. 6B is a perspective view showing the sealing boot of the invention secured in place over the ruptured main of FIG. 6A;

FIG. 6C is a perspective view of the same ruptured main with globe valves installed on both sides, upstream and downstream from the position of the rupture and the sealing boot;

FIG. 6D is a perspective view showing one of the globe valves of FIG. 6C with a standard cutting tool attached thereto, its cutting head extending through the open valve to cut an opening into the water or gas main;

FIG. 6E is a second perspective view of the assembly of FIG. 6D wherein the head of the cutting tool has been withdrawn from the valve after the completion of the cutting operation and with the valve turned to a closed condition;

FIG. 6F is a perspective view showing a further step in the repair procedure in which stoppers have been connected to the two globe valves of FIG. 6C following the cutting operations of FIGS. 6D and 6E and in which a by-pass hose has been installed to carry the gas or water flow during the repair operation; and FIG. 6G is a perspective view of the repaired gas or water main with the sealed-off globe valves left in place.

DESCRIPTION OF THE PREFERRED EMBODIMENT

Referring more particularly to the drawing by characters of reference, FIGS. 1-5 disclose a sealing boot 10 and a tool 11 that is employed in securing or clamping the boot to a ruptured gas or water main 12.

Boot 10 comprises two semi-cylindrical sections 10A and 10B joined together along mating edges by means of a suitable hinge 13 such as a piano hinge configuration. Each of the sections 10A and 10B has a metal outer shell 14 for mechanical strength and rigidity and a relatively thick elastic liner 15. Liner 15 may be formed of a suitable material such as rubber or neoprene which will readily conform to the outer surfaces of the gas or water main and the edges of the rupture or fracture in the pipe so as to provide the necessary sealing action.

Positioned and rigidly secured lengthwise along the outer surface of section 10A and along its center or crest line is arranged a stiffening ridge 16. The ridge is provided with a transverse opening or slot 17 at approximately its center with a longitudinal bore 18 extending therethrough from one of its ends to the other. Bore 18 is intended to receive a fastening pin 19 that is employed in securing tool 11 to boot 10.

Two openings or passages 21, one located near each end of ridge 16 are arranged to extend therethrough between ridge 16 and the outer periphery of shells 14. These passages provide clearance for aircraft screw-type hose clamps 22 which are employed to strap boot 10 securely in place about main 12 after the boot has been positioned and tightly clamped thereto by means of tool 11.

Tool 11 comprises lower and upper jaws 23 and 25, lower and upper stems 25 and 26, a crank 27, hand grip 28 and a threaded shaft 29. Lower jaw 23 is fixed to lower stem 25 and extends perpendicularly therefrom. Similarly, upper jaw 24 is fixed to upper stem 26 from which it also extends perpendicularly therefrom. A diagonal brace 31 stiffens the mounting of jaw 24 to stem 26. Stem 25 has a rectangular outer configuration or surface as viewed in cross-section with this surface slidably fitting inside a longitudinal opening in the lower portion of stem 26. The upper portion 26A of stem 26 has a threaded inner core that mates with the threaded shaft 29. Hand grip 28 is fixed to and extends perpendicularly from the side of stem 26 to which jaw 24 is secured. Crank 27 is threadedly connected to the top end of shaft 29 with the lower end of shaft 29 threadedly connected to the top end of stem 25.

In the operation of tool 11, the operator grips hand grip 28 with one hand and rotates crank 27 with the other. As crank 27 is rotated relative to shaft 29, stem 25 is moved upwardly or downwardly relative to stem 26 depending on its direction of rotation so that jaws 23 and 24 are opened or closed. A tool of this type was previously used to seal off a fractured or ruptured main by crimping. Previously the jaws 23 and 24 of tool 11 were simply placed around the pipe or main with one jaw extending under the main and the other jaw extending over the top of the main. As crank 27 was rotated with grip 28 held stationary, the jaws were tightened against the opposite surfaces of the pipe until it collapsed to the point that its inside surfaces were forced together terminating the flow of gas or water therethrough.

The original form of tool 11 is modified by adding a hole 32 near the center of the lower edge of jaw 24 as shown in FIG. 4. This hole is used in conjunction with pin 19 and the longitudinal bore 18 of ridge 16 to secure boot 10 to the upper jaw 24 of tool 11. With reference again to FIG. 4, this is accomplished by lowering the bottom edge of jaw 24 into the transverse slot 17 of ridge 16, aligning hole 32 with bore 18 and then passing pin 19 through bore 18 and hole 32.

The utilization of boot 10 in accordance with the stated objects of the invention will now be described proceeding from the attachment of the boot to jaw 24 of tool 11.

Once a rupture or fracture 33 in pipe or main 12 has been located and uncovered, as shown in FIG. 6A, tool 11 with boot 10 attached thereto is lowered into an opening 34 in the ground excavated around the rupture. The jaws 23 and 24 of tool 11 at this time are opened sufficiently so that the lower section 10B of boot 10 is pivoted downwardly as shown in FIG. 4. This condition of boot 10 affords an opening between the unhinged longitudinal edges 35 and 36 of sections 10A and 10B that is wide enough to clear the diameter of pipe 12. Boot 10 is then maneuvered by means of tool 11 to a position in which the lower section 10B passes under the main or pipe 12 and the upper section 10A of boot 10 passes over pipe 12 at the location of the rupture 33.

With grip 28 held stationary, crank 27 is then rotated in a direction that causes jaws 23 and 24 to close. As jaw 23 is thus moved upwardly, section 10B of boot 10 is pivoted about hinge 13 toward engagement or closure with section 10A. The closing action continues until boot 10 is clamped securely about pipe 12 over rupture 33 to seal off rupture 33 and totally stem or stop the leakage of gas or water flowing through the ruptured main.

Allowing sufficient time for the air in opening 34 to be cleared of any gas that has escaped previously to the application of boot 10, two screw clamps 22 are then passed through openings 21 under ridge 16 and are tightened in place about boot 10. The position of one of these clamps 22 about boot 10 is shown in FIG. 3.

Tool 11 is then removed by turning crank 27 in a direction which releases the grip of jaws 23 and 24 about boot 10, withdrawing pin 19, and then withdrawing the tool from opening 34. Rupture 33 is at this time sealed off by means of boot 10 as shown in FIG. 6B.

The flow of gas or water 37 through pipe 12 is continued without interruption after the rupture has occured but the leakage of these products to atmosphere, as shown in FIG. 6A, has been effectively sealed off. If a repair crew is not immediately available opening 34 may be protected and its location identified until repairs can be made.

The repair procedure involves a number of steps which are executed in a manner that permits the continuity of service to customers downstream from the fracture or rupture in pipe 12.

The first step involves the mounting of two globe valves 38 and 39, the first valve 38 being mounted upstream from boot 10 and the second valve 39 being mounted downstream from boot 10.

These globe valves are attached to pipe 12 by means of sealing couplers 41. Both valves 38 and 39 and couplers 41 are commonly employed in operations relating to gas distribution systems.

Coupler 41 is a two-part structure comprising an upper member 41A and a lower member 41B. The upper and lower members are placed over a continuous section of pipe 12 in opposing mating relationship with each other and are secured in position about pipe 12 by means of screw type hose clamps 42 as shown in FIG. 6C. Flexible gaskets or liners on the surfaces of members 41A and 41B facing pipe 12 afford gas tight seals between pipe 12 and coupler 41.

Globe valves 38 and 39 are adjustable to open or closed positions by means of a control grip 43. Nipples 44 at the upper and lower ends of the valves 38 and 39 permit attachment to pipes or other plumbing fittings. As shown in FIG. 6C the lower nipples 44 of valves 38 and 39 are coupled into mating nipples of the couplers 41.

At this point, there is no communication between the interior of pipe 12 and the interior of passages of couplers 41 and valves 38 and 39.

To effect such communication without loss of gas or interruption of flow through pipe 12, a commonly-employed tool known as a "plastic pipe drilling machine" 45 is employed as illustrated in FIGS. 6D and 6E. The drilling machine 45 is first mounted atop the globe valve 38 or 39 as shown in FIG. 6D. The machine 45 is gas tight and all externally rotatable members employ gas tight seals. It has a chip-retaining cutter head 46 at the lower end of a shaft 47 which may be rotated and lowered by means of a hand crank 48. With valve 38 or 39 set to the open position, the head 46 is lowered through the open valve. The crank 48 is then turned and an opening is cut through the wall of pipe 12. Stop nuts 48' on shaft 47 limit the downward travel of head 46 to prevent cutting through the far wall of pipe 12. When the desired opening has been cut into pipe 12, head 46 is withdrawn to a position above valve 38 or 39 as shown in FIG. 6E. The valve 38 or 39 is then closed and machine 45 is removed from atop valve 38 or 39.

After cutting operations are completed at both valves 38 and 39 as just described, a "brake cup stopperin tool" 49 is mounted atop both valves as shown in FIG. 6F.

The "brake cup stopperin tool" 49 is a commonly employed tool in the gas distribution industry. Tool 49 comprises a control shaft 51 inside a main passage or pipe section 52 and a stop cock 53 attached to a second pipe 54 which is coupled perpendicularly to pipe section 52 by means of a T fitting 55. An off-set flat circular vane 56 is mounted at the lower end of shaft 51. The upper end of shaft 51 extends through a sealed opening at the top end of section 52 and is there topped by a control grip 57. The shaft 51 may be rotated and moved vertically within section 52 by means of grip 57.

Once the brake stopperin tool 49 has been mounted atop globe valve 38 as shown in FIG. 6F with stop cock 53 facing in the direction of globe valve 39, and an identical tool 40 mounted atop valve 39 with its stop cock facing in the direction of valve 38, a connecting tube 58 is installed between the external ports of the two stop cocks 53 now opened.

Valve 38 is now opened and vane 56 is lowered through valve 38 until vane 56 has been moved inside pipe 12. Shaft 51 is then rotated until vane 56 is perpendicular to the length of pipe 12 and is offset toward and facing in the direction of valve 39. In like fashion, vane 56 of tool 49 mounted on valve 39 is lowered into pipe 12 and is rotated to face the direction of valve 38. The two vanes 56 now effectively seal the section of pipe 12 lying between the two couplers 41.

Boot 10 may now be removed and replaced by additional pipe 12' and couplers 61 as shown in FIG. 6G. Valves 38 and 39 are then closed and the tools 49 and tube 58 are removed. The upper openings of valves 38 and 39 are then permanently sealed off by means of pipe stubs 62 and caps 63. The capped-off valves 38 and 39 are left permanently on pipe 12 as shown in FIG. 6G and the repairs have been successfully completed without interruption of customer service in accordance with the stated objects of the invention.

It should be noted that it is intended to be within the scope of this invention to form the boot out of two plastic arcuate members interconnected along a common longitudinal edge by an integral web formed on the same material serving as the hinge means 13.

Although but a single embodiment of the invention has been illustrated and described it will be apparent to those skilled in the art that various changes and modifications may be made therein without departing from the spirit of the invention or from the scope of the appended claims.

What is claimed is:

1. A boot for sealing a ruptured gas or water main comprising:

a pair of arcuate members hingedly connected along a common edge and rotatable about said hinge to form a hollow cylinder when their free edges are in an abutting relationship, resilient means for lining the interior of each of said arcuate members, said resilient means forming a cylindrical configuration within said hollow cylinder when the free edges of said members are in abutting relationship, attachment means provided on the outer periphery of one of said members for pivotally connecting to a tool for rotating it relative to the other of said members, said attachment means comprising a ridge having two spacedly aligned parts extending longitudinally of said one of said members, each of said parts having an aperture extending longitudinally therethrough in axial alignment with the other, and a rod extending through each of said parts and bridging the space therebetween, whereby the tool is mounted on said rod between said parts of said ridge.

2. The boot set forth in claim 1 in further combination with:

clamp means extending through said attachment means and around said members when their free edges are in abutting relationship for holding said members together in said cylindrical configuration.

3. The boot set forth in claim 1 in further combination with:

clamp means extending through each of said parts and around said members when their free edges are in abutting relationship for holding said members together in said cylindrical configuration.

4. The boot set forth in claim 3 wherein:

said clamp means extends through each of said parts between said rod and the outer surface of said one of said members.

5. The boot set forth in claim 4 wherein:

said clamp means comprises two screw-type hose clamps.

6. The boot set forth in claim 1 in further combination with:

a tool surrounding said boot and pivotally connected to said one of said members for rotating said one of said members relative to the other of said members.

7. The boot set forth in claim 6 wherein:
said tool comprises a pair of jaws,
one of said jaws being pivotally attached to said attachment means, and
means for moving said jaws relative to each other causing said one of said members to pivot about its hinged attachment to the other of said members within the spaced between said jaws.

* * * * *